J. CRUES.
MUD GUARD.
APPLICATION FILED AUG. 23, 1912.
1,108,833.
Patented Aug. 25, 1914.
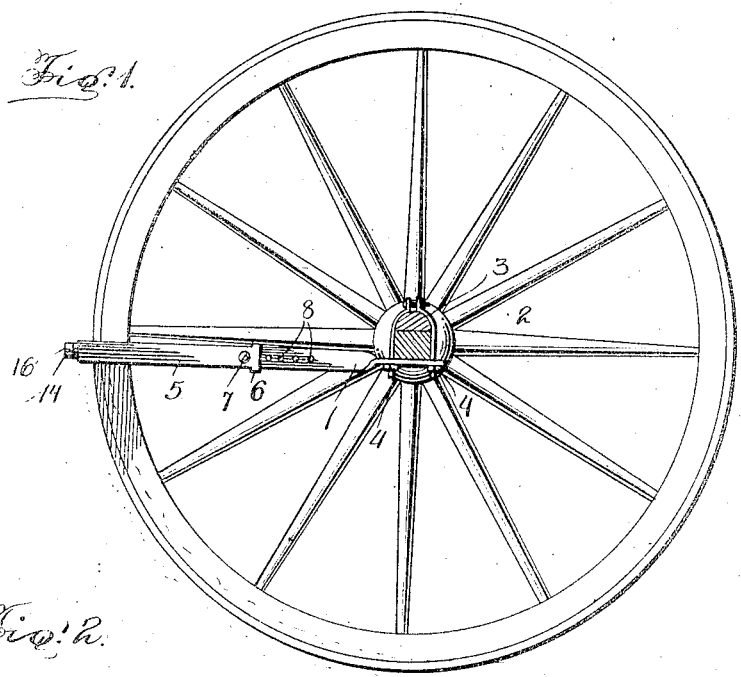
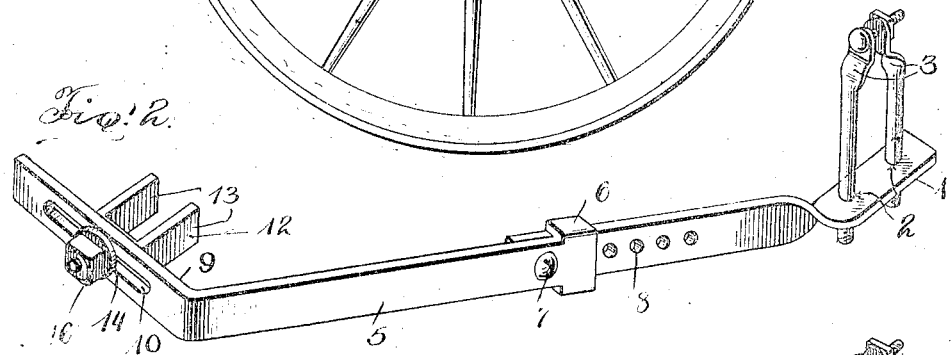
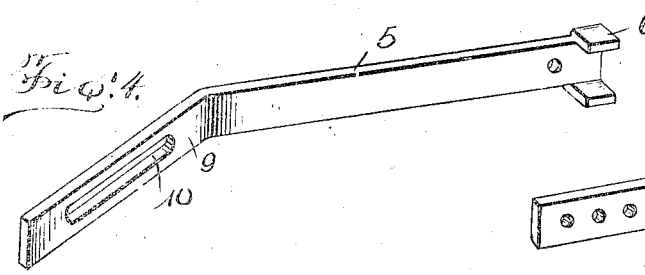
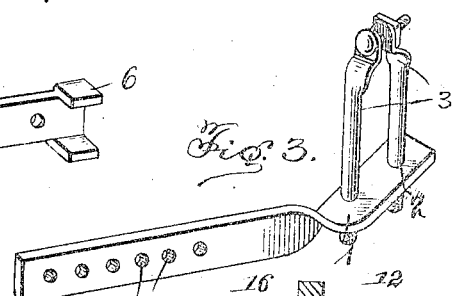
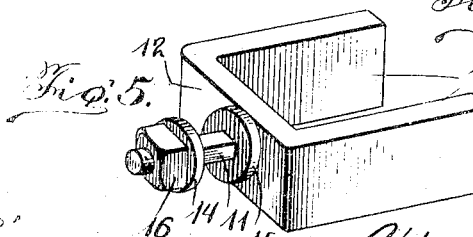
Witnesses
Ernest Crocker
P. M. Smith
Inventor
James Crues
By Victor J. Evans
Attorney

UNITED STATES PATENT OFFICE.

JAMES CRUES, OF MOBERLY, MISSOURI.

MUD-GUARD.

1,108,833.

Specification of Letters Patent. Patented Aug. 25, 1914.

Application filed August 23, 1912. Serial No. 716,732.

*To all whom it may concern:*

Be it known that I, JAMES CRUES, citizen of the United States, residing at Moberly, in the county of Randolph and State of Missouri, have invented new and useful Improvements in Mud-Guards, of which the following is a specification.

This invention relates to mud guards or scrapers, the object in view being to provide a device of the class described which may be readily applied to the axle of a vehicle, and which embodies ample adjustment for the purpose of bringing the guard or scraper proper into the desired relation to the wheel rim and tire, also enabling the device as a whole to be adjusted to wheels of different sizes.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a view, showing the device of this invention in elevation and applied to the axle and wheel of the vehicle. Fig. 2 is a perspective view of the device completely detached. Fig. 3 is a perspective view of the fixed supporting arm. Fig. 4 is a similar view of the adjustable cutter arm. Fig. 5 is a similar view of the cutter. Fig. 6 is a detail section showing the connection between the cutter and its supporting arm.

The device contemplated in this invention comprises essentially a main supporting arm 1 which is made comparatively heavy, the lower end thereof being provided with holes 2 to receive the end portions of the U-shaped clip 3, on the extremities of which are threaded nuts 4. This adapts the supporting arm 1 to be firmly secured to a vehicle axle, adjacent to the wheel thereof, and at the inner side of the wheel.

5 designates a cutter arm of any suitable length which overlaps the main supporting arm at the inner side thereof, as shown, and is provided at its lower extremity with oppositely arranged guide lugs or ears 6, which straddle the main supporting arm and assist in holding the two overlapping portions in longitudinal alinement with each other.

7 designates a fastening screw which passes through a hole in the cutter arm and is threaded into any one of a series of holes 8 in the main supporting arm, as shown. This provides for lengthening and shortening the device as a whole, in order to bring the guard or cutter into the proper relation to the wheel rim and tire. At its upper end, the cutter arm is bent and extended laterally, as shown at 9, and such laterally extending portion is provided with a longitudinal slot 10 which receives the squared shank 11 of a bifurcated scraper or cutter 12, the two arms 13 of which work on opposite sides of the tire and rim, so as to scrape the mud therefrom and prevent the same from accumulating around the rim and tire. Above and beneath the slotted lateral portion of the cutter arm, washers 14 and 15 are placed on the squared shank of the cutter, the cutter being held against displacement by means of a nut 16, which holds the washer 14 against a shoulder 17 on the shank of the cutter, so as to allow a free back and forth movement of the cutter lengthwise of the slot in the lateral extension of the cutter arm.

It will now be understood from the foregoing description, that when the device is properly applied to an axle and wheel, the bifurcated cutter will accommodate itself to the wheel, and to any irregularities therein, in case the wheel is not perfectly true. This prevents injuring the wheel and the finish thereof, and results in effecting the scraping of the mud from the rim and tire, as fast as it is picked up from the ground.

What is claimed is:

An attachment for vehicles involving the combination of a supporting arm having a laterally extending end portion provided with a longitudinal slot, means for fastening said arm to a vehicle wheel axle, and a self-adjusting wheel rim straddling cutter having a squared and shouldered shank slidable freely back and forth in said slot and held against rotation thereby, and a shank retaining nut, the shoulder of said shank serving to limit the tightening of the nut for the purpose set forth, whereby the cutter is prevented from tilting relatively to said supporting arm.

In testimony whereof I affix my signature in presence of two witnesses.

JAMES CRUES.

Witnesses:
PHARES K. WEIS,
J. M. PROSSER.